United States Patent [19]
Redmond

[11] Patent Number: 4,936,812
[45] Date of Patent: Jun. 26, 1990

[54] TORQUE REACTIVE TENSION MECHANISM AND METHOD

[75] Inventor: John D. Redmond, Littleton, Colo.

[73] Assignee: The Gates Rubber Company, Denver, Colo.

[21] Appl. No.: 229,185

[22] Filed: Aug. 5, 1988

[51] Int. Cl.⁵ .............................................. F16H 55/30
[52] U.S. Cl. ................................................... 474/141
[58] Field of Search ............... 474/141, 148, 112, 152; 74/390, 438, 804, 805

[56] References Cited
U.S. PATENT DOCUMENTS
4,768,998 9/1988 Hirose et al. .................... 474/112 X Primary Examiner—Thuy M. Bui
Attorney, Agent, or Firm—H. W. Oberg, Jr.; C. H. Castleman, Jr.

[57] ABSTRACT

A tension compensating gear set of the eccentric type for use with a flexible power transmission member with a gear member having at least one external circumferential surface in rolling contact with an internal circumferential surface of an annular gear method for controlling tooth meshing while inhibiting noise or vibration. An eccentric gear set is used as a method or means for automatically adjusting for fluctuations in center distance of a power transmission drive system.

22 Claims, 2 Drawing Sheets

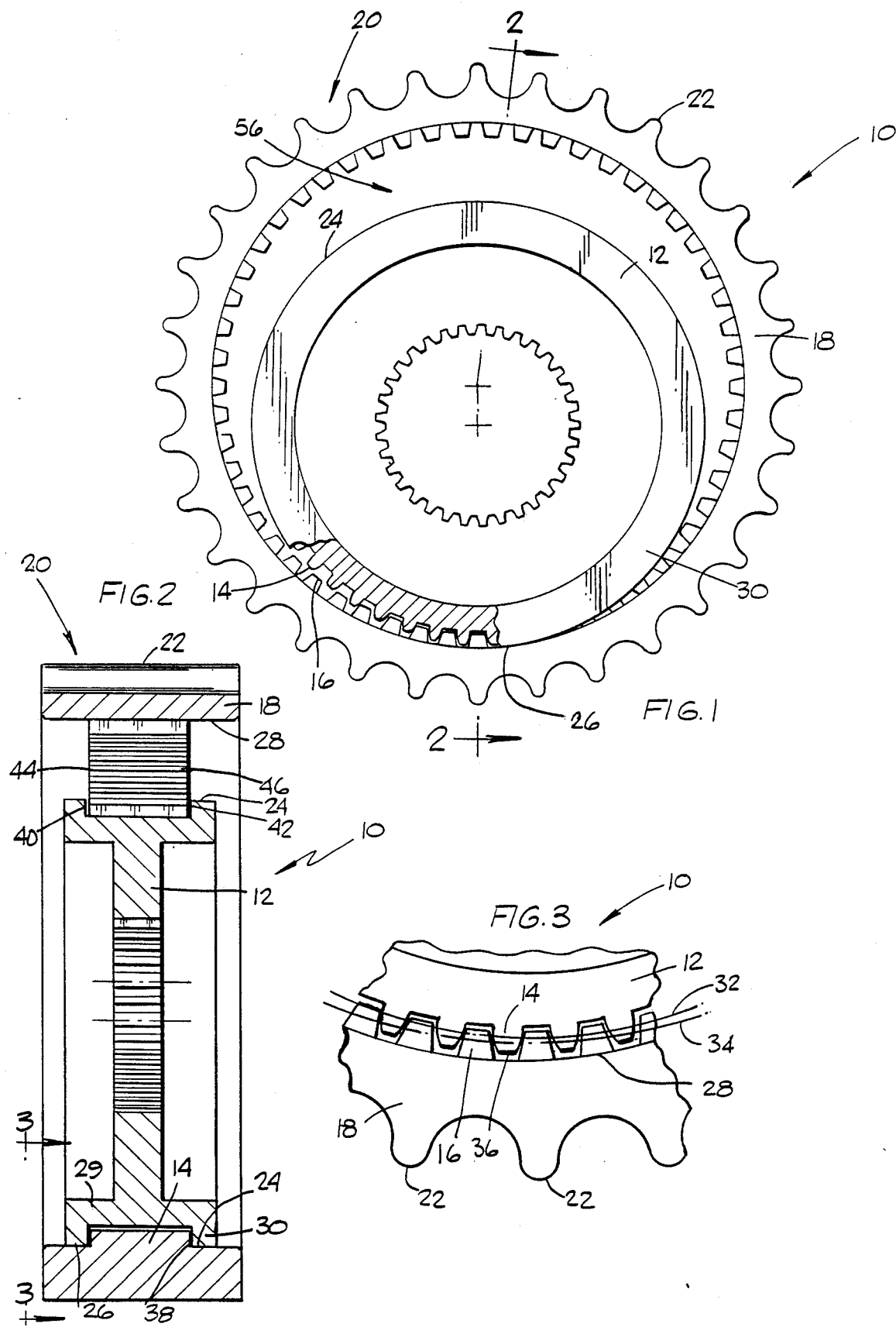

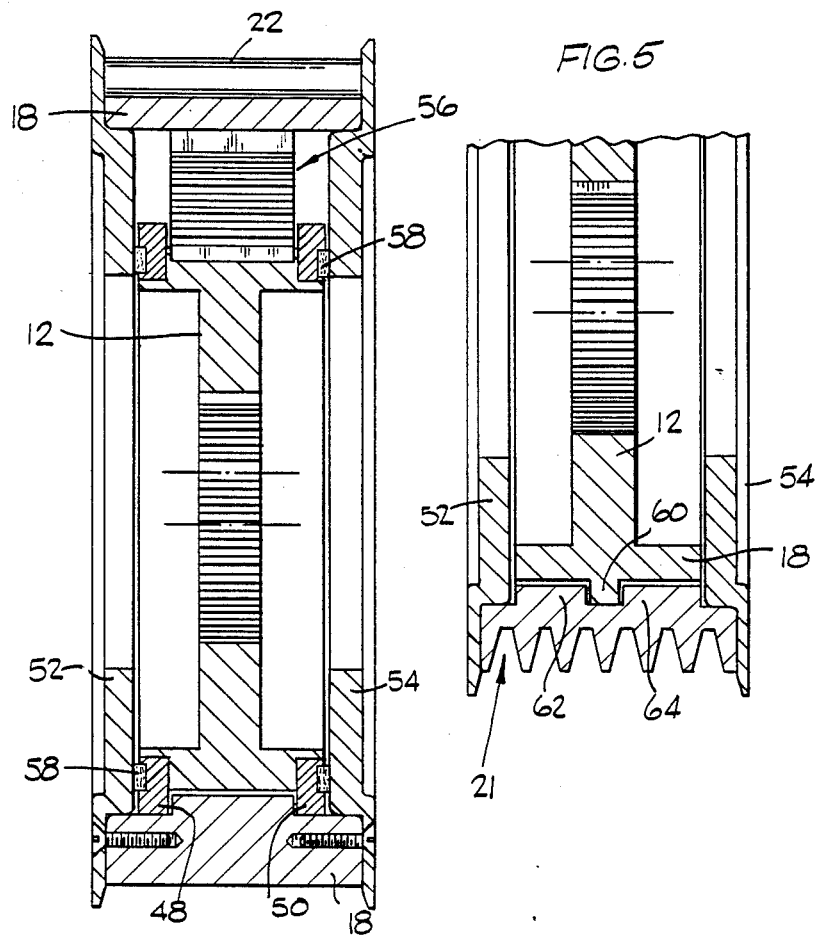
FIG.5
FIG.4
FIG.6
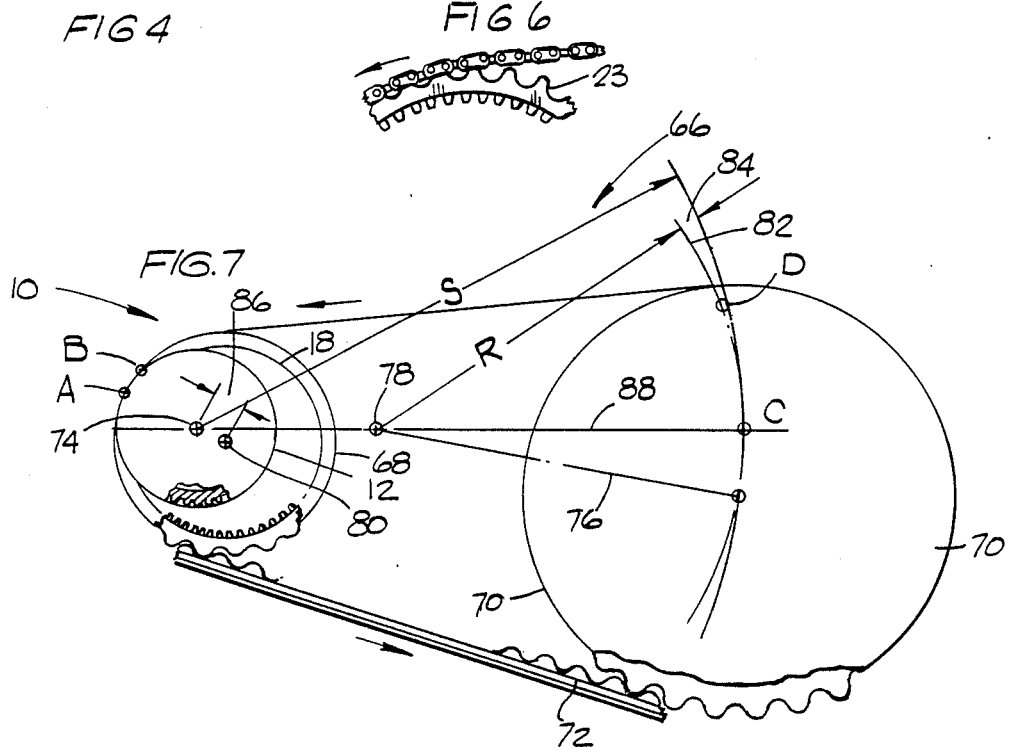
FIG.7

TORQUE REACTIVE TENSION MECHANISM AND METHOD

BACKGROUND OF THE INVENTION

The invention relates to power transmission systems and components of the type including a pulley having a circumferentially spaced portion of its drive face spaced unequal distances from the pulley axis of rotation, but more particularly, the invention relates to a tension compensating gear set of the eccentric type with a gear member having external teeth that mesh with internal teeth of a floating, annular gear member.

Eccentric type gear sets are used for a variety of purposes in power transmission systems with a flexible power transmission member. For example, such gear sets may be used to increase the minimum bend radius of a flexible power transmission member such as illustrated in German Patent No. 115,719; as a speed reduction means as shown in U.S. Pat. No. 3,190,149; or as a means for compensating for differences in tension in a flexible power transmission member such as shown in U.S. Pat. No. 4,501,576. The term "flexible power transmission member" as used herein includes a toothed or synchronous belt, a V-belt, a V-ribbed belt, a flat belt, and a chain.

Radial disengagement of meshing teeth of a tension compensating gear set is characteristically inhibited by a flexible power transmission member, and lateral disengagement of meshing teeth of the gear set may be prevented by lateral side plates of the type as disclosed in aforementioned U.S. Pat. No. 4,501,576 or German OS 31 00 922.

Problems associated with such eccentric type gear sets as used with a flexible power transmission member, are that of noise and vibration as caused by the annular gear member not having a fixed or precise center of rotation. Variations in tension of the flexible power transmission member cause a radially inward force to be applied to the annular gear member causing its gear teeth to wedge with the teeth of the gear member and carry radial loads; this radial force is in addition to the tangential force carried by the gear teeth at their meshing flank surfaces.

SUMMARY OF THE INVENTION

In accordance with the invention, a tension compensating gear set is provided that is of the eccentric type with a gear member meshing with an annular gear member. The gear member has at least one external circumferential surface in rolling contact with an internal circumferential surface of the annular gear member; together, the circumferential surfaces in rolling contact with each other define a means that controls meshing of the internal and external teeth of the gear members. Under one aspect of the invention, the gear member has a flange or an annular ring which defines its circumferential surface of rolling contact and also optionally acts as a means for preventing lateral disengagement of the floating, annular gear member. The circumferential surfaces, by controlling tooth meshing, substantially reduce noise and vibration. When a flange is included and defines a circumferential surface of rolling contact, the need for guide plates to prevent lateral disengagement of the gear member, may be omitted.

Under a method of the invention, a change in center distance between two pulley members is automatically compensated for by providing one of the pulley members with a gear set of the eccentric type and selecting pitch diameters of a gear member and an annular gear member to have an eccentric offset that is greater than a maximum change in center distance expected between the pulley members. Noise and vibration of such a drive are reduced by the method of providing the gear member and annular gear member with circumferential surfaces of rolling contact which control tooth meshing and prevent radial loading between tooth tips and land surfaces.

While side plates are not necessarily needed to preclude lateral disengagement of the gear member, side plates may be used in conjunction with other aspects of the invention and as a means for inhibiting dirt or other foreign material from entering a crescent shaped volume formed between the gear member and annular gear member or to preclude lateral disengagement. Side plates may also be used to lend lateral support to annular ring or flange members.

An object of the invention is to provide a means and method for inhibiting noise and vibration of a tension compensating gear set of the eccentric type that is used in conjunction with a flexible power transmission member.

Another object of the invention is to provide a means and method for compensating for center distance changes in a power transmission system that has at least two pulleys which entrain a flexible power transmission member.

An advantage of the invention is that noise and vibration of an eccentric type gear set of a power transmission system with a flexible power transmission member, is substantially reduced; the need for side plates to control lateral disengagement of a floating gear member may be optionally eliminated or minimized; and changes in center distance of a power transmission system may be automatically compensated. These and other objects are advantages of the invention will be more apparent after reviewing the drawings and detailed description thereof wherein:

FIG. 1 is an axial-end view of a tension compensating gear set of the invention;

FIG. 2 is a cross-sectional view taken along the line 2—2 of FIG. 1;

FIG. 3 is an enlarged and partial cross-sectional view taken along the line 3—3 of FIG. 2;

FIG. 4 is a view similar to FIG. 2 but showing the addition of annular side plates as another embodiment of the invention;

FIG. 5 is a partial view similar to FIG. 4 but showing another embodiment of the invention;

FIG. 6 is a partial view similar to FIG. 1 but showing another embodiment of the invention;

FIG. 7 is a side schematical view of a power transmission system or drive that includes a tension compensating gear set of the invention, and illustrates a method for automatically compensating for a change in center distance of a drive with a swing arm that carries one pulley of the drive.

DESCRIPTION OF PREFERRED EMBODIMENTS

Referring primarily to FIGS. 1-3, a tension compensating, eccentric type gear set 10 of the invention is shown and includes a gear member 12 having external teeth 14 that mesh with internal teeth 16 of a floating, annular gear member 18. A drive face 20 of the annular gear member may have any desired form for the purpose of engaging a flexible power transmission member; for example, and as shown in a preferred embodiment, the drive face may be in the form a plurality of axially oriented teeth 22 adapted to engage teeth of a toothed or synchronous power transmission belt. Other examples of the drive face are one or more circumferential V-grooves 21 adapted to receive one or more belts of the V-type (FIG. 5) a circumferential surface adapted to receive a flat type belt; or sprocket teeth 23 adapted to receive an endless chain (FIG. 6).

The gear member 12 has at least one external circumferential surface 24 located in rolling contact 26 with at least one internal circumferential surface 28 of the annular gear member 18; the surfaces are preferably cylindrically shaped. Optionally and preferably, gear teeth 14 of the gear member are interpositioned between two flange members 28, 30 or annular rings that each define the external circumferential surface 24 that makes rolling contact with juxtaposed internal circumferential surface 29 of the annular gear member. As used herein, the term "annular flange member" includes an intregral flange 29, 30 as shown in FIG. 2 or an annular ring 48, 50 arranged to define a non-intregral annular flange as shown in FIG. 4. The location of the circumferential surfaces in rolling contact 26 is such as to position the operating pitch circles 32, 34 of the gear members to substantially preclude them from overlapping each other so that meshing teeth are not wedged together in "tight meshing". Preferably, the operating pitch circles are located to be substantially tangent with or spaced from each other to control tight meshing of the internal and external gear teeth. The rolling circumferential surfaces permit the option of the teeth of the gear member to be truncated or stubbed to provide a positive clearance 36 between the external and external meshing gear teeth for radial assembly. Or optionally, the flange members or annular rings of the gear member may radially extend beyond 38 the teeth of the gear member so as to provide the positive clearance that precludes tooth tip interference for the purpose of controlling noise and vibration.

When the teeth of the gear member are positioned between two annular flange members 29, 30, the lateral or oppositely facing sides of the flange members 40, 42 are located juxtaposed opposite facing sides 44, 46 of gear teeth of the annular gear member. The flanges or rings in conjunction with meshing teeth of the gear member, define a means for preventing lateral disengagement of the floating, annular gear member.

Referring to FIG. 4, annular rings 48, 50, instead of flanges are optionally provided to control meshing of the gear teeth to inhibit noise and vibration. When annular rings are used, it is desirable to include annular side plates 52, 54 which attach to or are integral to the ring gear member such as shown in FIG. 4. Preferably, the side plates are positioned juxtaposed the annular rings to lend lateral support thereto and are radially sized so as to completely cover a crescent-shaped volume 56 between the gear member and annular gear member. Optionally, a seal 58 may be used between the side plates and gear member as a further means for inhibiting entry of debris or as a means for retaining a lubricant within the crescent shaped volume.

As shown in FIG. 5, only one annular flange 60 or ring member is needed to establish controlled meshing of the gear teeth. The ring is interpositioned between two gear sections 62, 64 of the gear member and defines an external circumferential surface that may be cylindrically shaped. Oppositely facing sides of the flange abut sides of annular gear teeth and define a means for inhibiting lateral disengagement of the gear member.

In one aspect of the invention, an eccentric type gear set is used as a means and method for automatically adjusting to accommodate (1) a fluctuating center distance and (2) fluctuating tension in a flexible power transmission member, the fluctuating tension responsive to changes in torque of a belt drive system. In another aspect of the invention, a fluctuating center distance and tension in a flexible power transmission member (as for example, a belt or chain) are accommodated at the same time that noise and vibration are attenuated. Referring to FIG. 7, a drive system 66 includes at least two pulleys 68, 70 which entrain a flexible power transmission member such as a synchronous belt 72, and where one of the pulleys includes a gear set 10 of the eccentric type with a gear member 12 having external teeth that mesh with internal teeth of a floating, annular gear member 18.

As schematically illustrated, the gear member has a fixed center 74 of rotation such as located on the output shaft of a transmission (not shown). The annular gear member is held in meshing contact with the gear member by the synchronous belt, and is free to change position in response to changes in belt tension as induced by variations in torque or a change in center distance. The driven pulley 70 of the drive is mounted on a swing arm 76 having a radius R that pivots about a center 78 which is other than the effective center 80 of rotation of the driven pulley having the gear set. The driven pulley is free to move up and down about an arc 82 which has the effect of varying or fluctuating the center distance between pulleys and incremental distance or amount 84 because the Radius R is less than a radius S that is substantially equal to the center distance. The pitch diameter of the gear member and annular gear member are chosen wherein half the difference between the pitch diameter of the internal teeth of the annular gear member and the pitch diameter of the external teeth of the gear member defines an eccentric offset 86 of the gear set that is greater than the maximum incremental distance 84 effected by the swing arm.

Preferably, the point of mesh A of the gear set is offset to one side of a center line 88 between pulleys when the flexible power transmission member is entrained at a predetermined installation tension.

Presuming that there are no variations in torque at the driver or driven pulley, the point of mesh A of the gear set will move from point A to point B as the center of rotation of the driven pulley is moved from point C to point D effecting a incremental decrease in center distance. Should there be variations in torque at either the driver or driven pulley in addition to changes in center distance, the point of mesh of the eccentric gear set will also change to accommodate such variations while simultaneously adjusting the tension carried by the flexible power transmission member such as a belt. However, the point of mesh should be less than perpendicular to the belt so that belt tension keeps the gear set in mesh.

Noise and vibration of the illustrated drive are substantially attenuated by using a pulley of the invention with a gear member having at least one external circumferential surface of rolling contact with at least one internal circumferential surface of the annular gear member. By reducing noise and vibration, the circumferential surfaces also inhibit tooth wear by eliminating or minimizing tooth wedging.

To illustrate the effectiveness of the eccentric gear set and method of the invention, a Harley Davidson ® 1200 cc motorcycle was outfitted with a belt drive system with an eccentric gear set of the type shown in FIG. 4 with side plates as a means for retaining a lubricant. The following example lists the drive design parameters:

EXAMPLE

| Eccentric Gear Set, Driver Pulley | |
|---|---|
| gear, pitch diameter (in.) | 3.722 |
| gear, no. of external teeth | 67.0 |
| annular gear, pitch diameter (in.) | 4.333 |
| annular gear, no. of internal teeth | 78.0 |
| eccentric offset | .305 |
| Annular gear, no. of 14 mm external belt teeth | 32.0 |
| Driven Pulley | |
| Pulley diameter (in.) | 10.593 |
| Pulley teeth,no.(14 teeth, no. (14 pitch) | 61.0 |
| Drive Layout | |
| swing arm length (in.) | 17.63 |
| Center distance (in. nominal) | 23.81 |
| change in center distance (in.) | .07 |

A 132 tooth synchronous belt of 14 mm pitch was installed at an initial tension of approximately 200 pounds and the motorcycle was operated for 15,000 miles after which the drive was inspected. During operation, the eccentric gear set of the invention maintained proper belt tension by precluding belt jumping; reduced noise and vibration and was effective for accommodating length changes in center distance as effected by the swing arm mounting of the driven pulley. The drive system illustrates the effectiveness of the invention as it relates to minimizing noise and vibration; automatically adjusting for changes in center distance; and automatically adjusting for changes in torque. A salient feature of the invention that was experienced during the motorcycle testing is that the drive "felt" smoother to the rider as firing engine pulses were attenuated in the drive system.

The foregoing description is made for purpose of illustration only and is not intended to limit the scope of the appended claims.

What is claimed is:

1. In a tension compensating gear set of the eccentric type with a gear member having external teeth that mesh with internal teeth of a floating, annular gear member having an external means for engaging an endless, flexible power transmission member, wherein the improvement comprises:
   the gear member having at least one external, substantially cylindrical surface in rolling contact with at least one internal, substantially cylindrical surface of the annular gear member, together, the, substantially cylindrical surfaces in rolling contact with each other, defining a means for controlling meshing of the internal and external gear teeth.

2. The gear set of claim 1 wherein one of the gear members includes at least one annular flange member that defines the substantially cylindrical surface of such gear member.

3. The gear set of claim 1 including two annular flange members and wherein one of the gear members has its gear teeth interposed between the two included annular flange members, the flange members defining axially spaced, substantially cylindrical surfaces in rolling contact with the substantially cylindrical surfaces of the other gear member, the axially spaced flanges in conjunction with meshing teeth of the other gear member defining means for preventing lateral disengagement of the floating, annular gear member.

4. The gear set of claim 1 wherein the external engaging means of the annular gear member is a substantially cyclindrical surface adapted to receive a substantially flat power transmission belt.

5. The gear set of claim 1 wherein the external engaging means of the annular gear member is a plurality of transversly oriented teeth shaped to receive and engage a toothed power transmission belt.

6. The gear set of claim 1 wherein the engaging means of the annular gear member is a plurality of sprocket teeth shaped to receive and engage an endless chain.

7. The gear set as claimed in claim 1 which further comprises a pair of annular guide plates connected to sides of one of the gear members and extending radially an amount sufficient to cover a space volume formed between the meshing gear members and as a means for inhibiting entry of foreign material into the space volume.

8. The gear set as claimed in claim 1 wherein the gear members have teeth with operating pitch circles, and the substantially cylindrical surfaces in rolling contact with each other are radially located such that the operating pitch circles are substantially precluded from overlapping each other.

9. The gear set as claimed in claim 8 wherein teeth of at least one of the gear members are stubbed.

10. The gear set as claimed in claim 1 wherein the gear member includes at least one annular flange member that radially extends beyond the teeth of the gear member and defines the external, substantially cylindrical rolling surface of the gear member.

11. A method for controlling meshing and inhibiting gear noise in a power transmission system with at least first and second pulley members, an endless, flexible power transmission member entrained by the pulley members and where one of the pulley members is of the tension compensating, eccentric type with a gear member having external teeth located along a pitch circle that mesh with internal teeth located along a pitch circle of a floating, annular gear member, wherein the method comprises the steps of:
   providing the gear member with at least one external, substantially cylindrical surface;
   providing the annular gear member with at least one internal, substantially cylindrical surface;
   placing the substantially cylindrical surfaces in rolling contact with each other while simultaneously controlling meshing of the internal and external gear teeth by, substantially precluding the pitch circle of the gear member and the pitch circle of the annular gear member from overlapping each other.

12. The method of claim 11 which includes the step of providing each the gear member and annular gear member with at least two substantially cylindrical surfaces and placing the substantially cylindrical surfaces in rolling contact and controlling meshing.

13. In a power transmission system with first and second pulley members each having effective centers of rotation that are located along a center line and separated a center distance apart, an endless flexible power transmission member entrained by the pulleys and where one of the pulley members is of the tension compensating, eccentric type with a gear member having external teeth located at a pitch diameter that mesh at a point with internal teeth located at a pitch diameter of a floating annular gear member, wherein the improvement comprises:

a means for changing the center distance of the pulleys a predetermined incremental distance during operation of the system; and half the difference between the pitch diameter of the internal teeth of the annular gear member and the pitch diameter of the external teeth of the gear member defining an eccentric offset of the gear set wherein the eccentric offset is greater than the maximum incremental distance.

14. The power transmission system of claim 13 wherein the means for changing the center distance comprises a swing arm having one end portion having a pivot point spaced from the effective center of rotation of one of the pulley members and another end portion to which the other pulley member is carried along an arc about the pivot point.

15. The power transmission system of claim 14 wherein the point of mesh of the gear set is offset from one side of the center line between pulleys when the flexible power transmission member is entrained at a predetermined installation tension.

16. The power transmission system of claim 13 wherein the gear member has at least one external circumferential surface in rolling contact with at least one internal circumferential surface of the annular gear member, together, the circumferential surfaces in rolling contact with each other defining a means for controlling meshing of the internal and external gear teeth.

17. In a power transmission system with at least first and second pulley members, an endless, flexible power transmission member entrained by the pulley members, and where one one of the pulley members is of the tension compensating, eccentric type with a gear member having external teeth along a pitch circle that mesh with internal teeth located along a pitch circle of a floating, annular gear member, wherein the improvement comprises:

the gear member having at least one external, substantially cylindrical surface in rolling contact with at least one internal, substantially cylindrical surface of the annular gear member, together, the substantialy cylindrical surfaces in rolling contact with each other defining a means for controlling meshing of the internal and external gear teeth and a means for inhibiting gear noise.

18. The power transmission system of claim 17 which further comprises:

the gear member teeth interpositioned between two included annular flange members of the gear member that each define an external, substantially cylindrical surface that extends radially past the gear member teeth;

the floating annular gear member having two internal, substantially cylindrical surfaces, the internal and external, substantially cylindrical surfaces in rolling contact with each other; and the teeth of the annular gear member having oppositely facing sides which in conjunction with the annular flanges of the gear member define a means for preventing lateral dissengagement of the floating, annular gear member.

19. A method for automatically adjusting for a change in center distance between at least two pulley members of a power transmission system having effective centers of rotation where an endless, flexible power transmission member is at least partially entrained by said pulley members, the method comprising the steps of:

providing one of the pulley members with a gear set of the eccentric type including a gear member having external teeth that mesh with internal teeth of a floating annular gear member that includes a means for engaging the flexible, power transmission member;

selecting a pitch diameter for the gear member teeth and selecting a pitch diameter for the annular gear member and thereby establishing an eccentric offset of the gear set which is half the difference between the pitch diameter of the internal teeth of the annular gear member and the pitch diameter of the external teeth of the gear member; and providing an eccentric offset that is greater than the maximum change in center distance of the pulley members.

20. The method of claim 19 wherein the change in center distance is established by the step of:

providing a swing arm having one end portion having a pivot point spaced from the effective center of rotation of one of the pulley members and another end portion to which the other pulley member is carried along an arc about the pivot point.

21. The method of claim 19 which further includes the steps of:

providing the gear member with at least one external circumferential surface;

providing the annular gear member with at least one internal circumferential surface;

placing the circumferential surface in rolling contact with each other which simultaneously controlling meshing of the internal and external gear teeth.

22. In a tension compensating gear set of the eccentric type with a gear member having external teeth that mesh with internal teeth of a floating, annular member that includes an external means for engaging an endless, flexible power transmission member, wherein the improvement comprises:

the gear member teeth interposition between two included annular flange members of the gear members and the flange members each defining an external, substantially cylindrical rolling surface that extends radially past the gear member teeth;

the floating annular gear member having two internal, substantially cylindrical surfaces in rolling contact with the substantially cylindrical surfaces of the gear member, the substantially cylindrical surfaces in rolling contact with each other and defining a means for controlling meshing of the internal and external gear teeth; and the meshing teeth of the annular gear members having oppositely facing sides which in conjunction with the annular flanges of the gear member, define a means for preventing lateral disengagement of the floating, annular gear member.

* * * * *